(12) United States Patent
Manku

(10) Patent No.: US 9,937,680 B2
(45) Date of Patent: Apr. 10, 2018

(54) PELLET PRESS MACHINE

(71) Applicant: Kamal Manku, Macomb Township, MI (US)

(72) Inventor: Kamal Manku, Macomb Township, MI (US)

(73) Assignee: Kamal Manku, Macomb Township, MI (US)

( * ) Notice: Subject to any disclaimer, the term of this patent is extended or adjusted under 35 U.S.C. 154(b) by 90 days.

(21) Appl. No.: 14/974,701

(22) Filed: Dec. 18, 2015

(65) Prior Publication Data

US 2016/0176077 A1    Jun. 23, 2016

Related U.S. Application Data

(60) Provisional application No. 62/094,640, filed on Dec. 19, 2014.

(51) Int. Cl.
| | |
|---|---|
| B30B 15/30 | (2006.01) |
| B29C 43/34 | (2006.01) |
| B30B 11/00 | (2006.01) |
| A61J 3/10 | (2006.01) |
| B30B 11/14 | (2006.01) |
| B30B 15/06 | (2006.01) |
| B29C 43/04 | (2006.01) |

(52) U.S. Cl.
CPC ............ *B30B 11/00* (2013.01); *A61J 3/10* (2013.01); *B30B 11/14* (2013.01); *B30B 15/065* (2013.01); *B29C 43/34* (2013.01); *B29C 2043/046* (2013.01); *B29C 2043/3427* (2013.01); *B30B 15/302* (2013.01)

(58) Field of Classification Search
CPC ....... B30B 11/14; B30B 15/302; B29C 31/04; B29C 43/34; B29C 43/50; B29C 2043/046; B29C 2043/3427; A61J 3/10
See application file for complete search history.

(56) References Cited

U.S. PATENT DOCUMENTS

| | | | |
|---|---|---|---|
| 4,292,017 A | 9/1981 | Doepel | |
| 4,317,649 A | 3/1982 | Boellmann | |
| 5,417,903 A | 5/1995 | Harrison et al. | |
| 5,672,364 A * | 9/1997 | Kato | A61J 3/10 425/100 |
| 6,036,974 A * | 3/2000 | Tsushima | A61K 9/2095 424/464 |

(Continued)

*Primary Examiner* — James P Mackey
(74) *Attorney, Agent, or Firm* — Carlson, Gaskey & Olds, P.C.

(57) ABSTRACT

A pellet press machine, comprises a die block assembly for receiving powder to be compacted, and a press assembly for compacting the powder, the die block assembly laterally movable along a linear horizontal axis between the filling location at which an array of dies are filled with the powder to be pressed at the pressing location in which the powder in dies is pressed to form pellets. The filling assembly includes an auger driving by a motor to force the powder directly into dies. The auger further has a sharp edge sits right above the dies to force the powder directly into dies and the sharp edge scrapes the top surface of the dies so as to allow the high degree accuracy of filling dose for each die. With this filling assembly, the pellet press machine can product high density and small diameter pellet with high density and sticky density powder.

20 Claims, 11 Drawing Sheets

(56) References Cited

U.S. PATENT DOCUMENTS

| | | |
|---|---|---|
| 6,116,890 A | 9/2000 | Sors |
| 7,883,330 B2 * | 2/2011 | Inoue .................... B30B 11/14 425/183 |
| 2009/0130243 A1 | 5/2009 | Inoue |

* cited by examiner

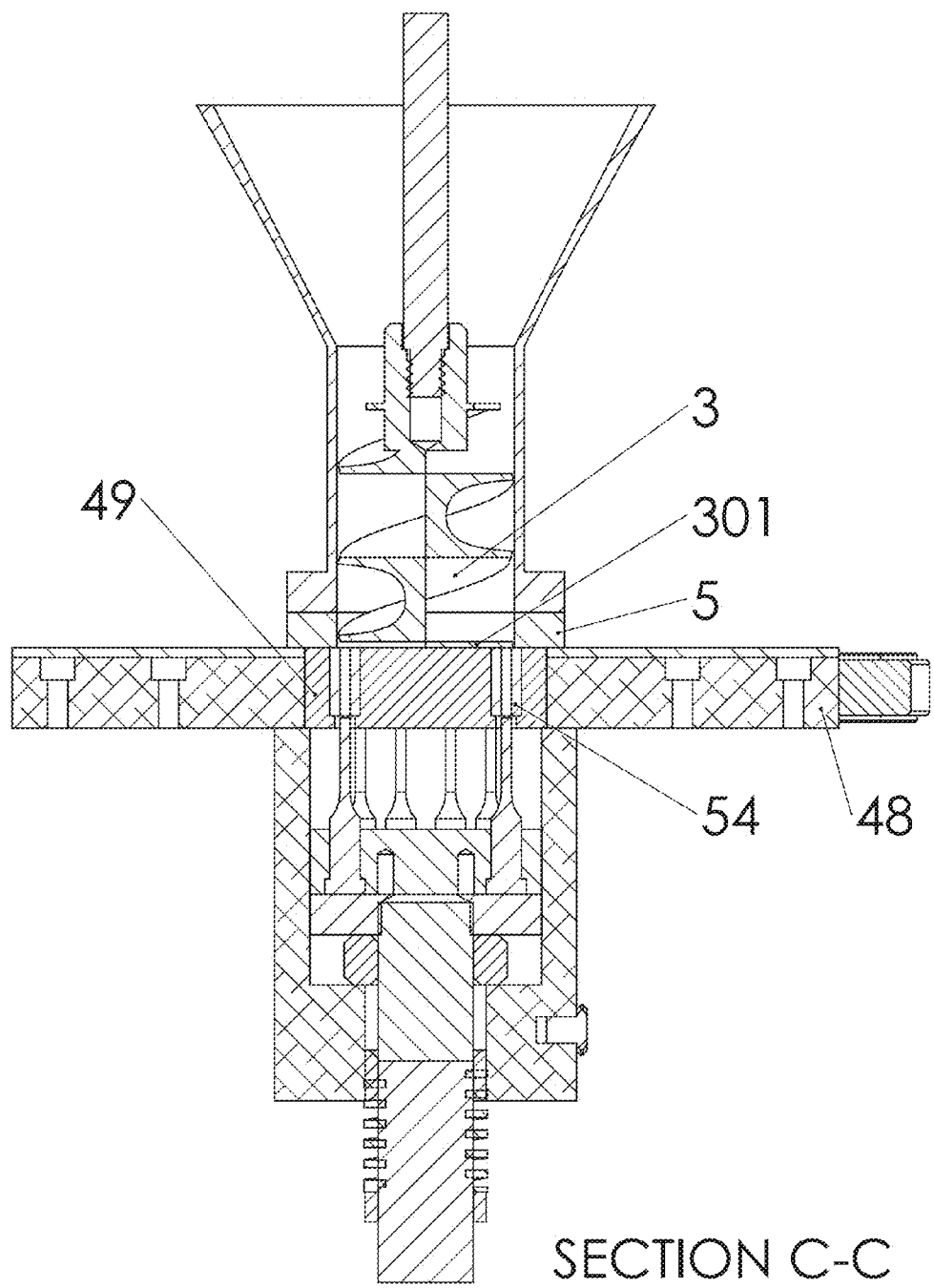

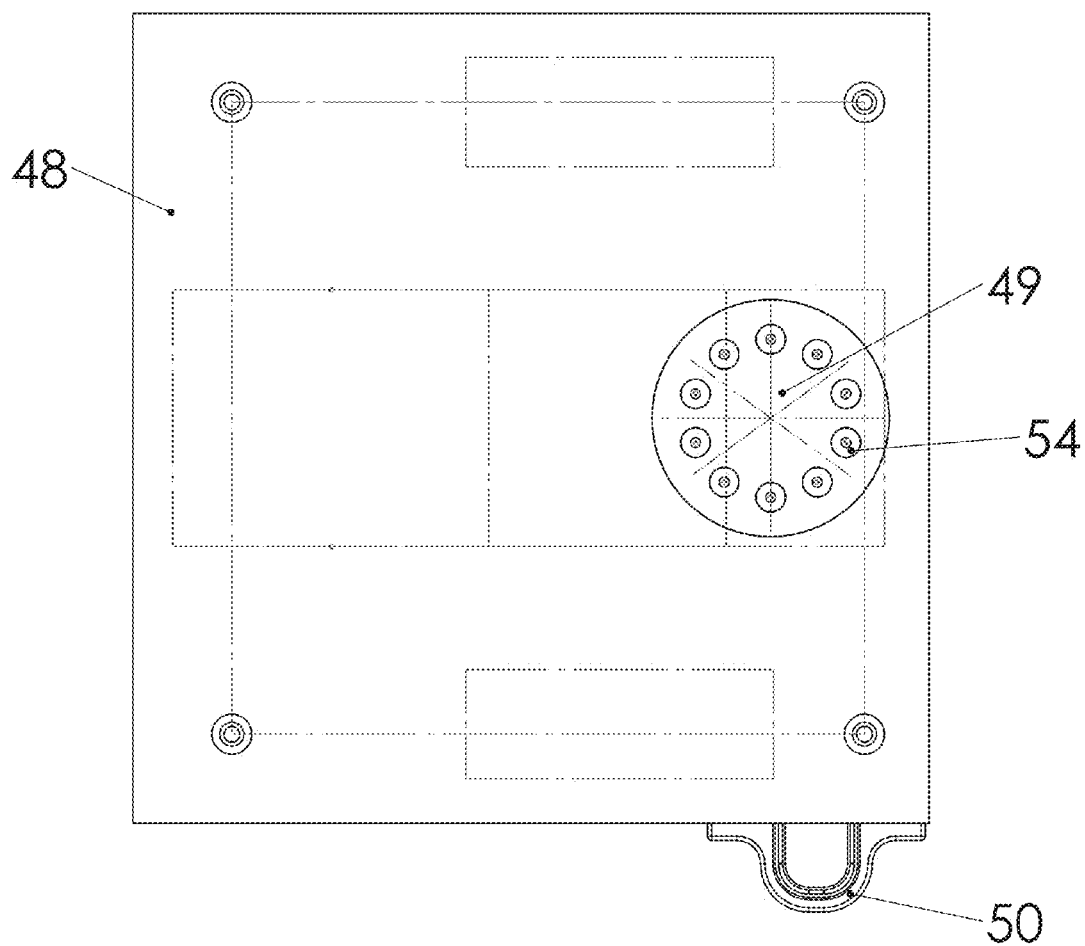

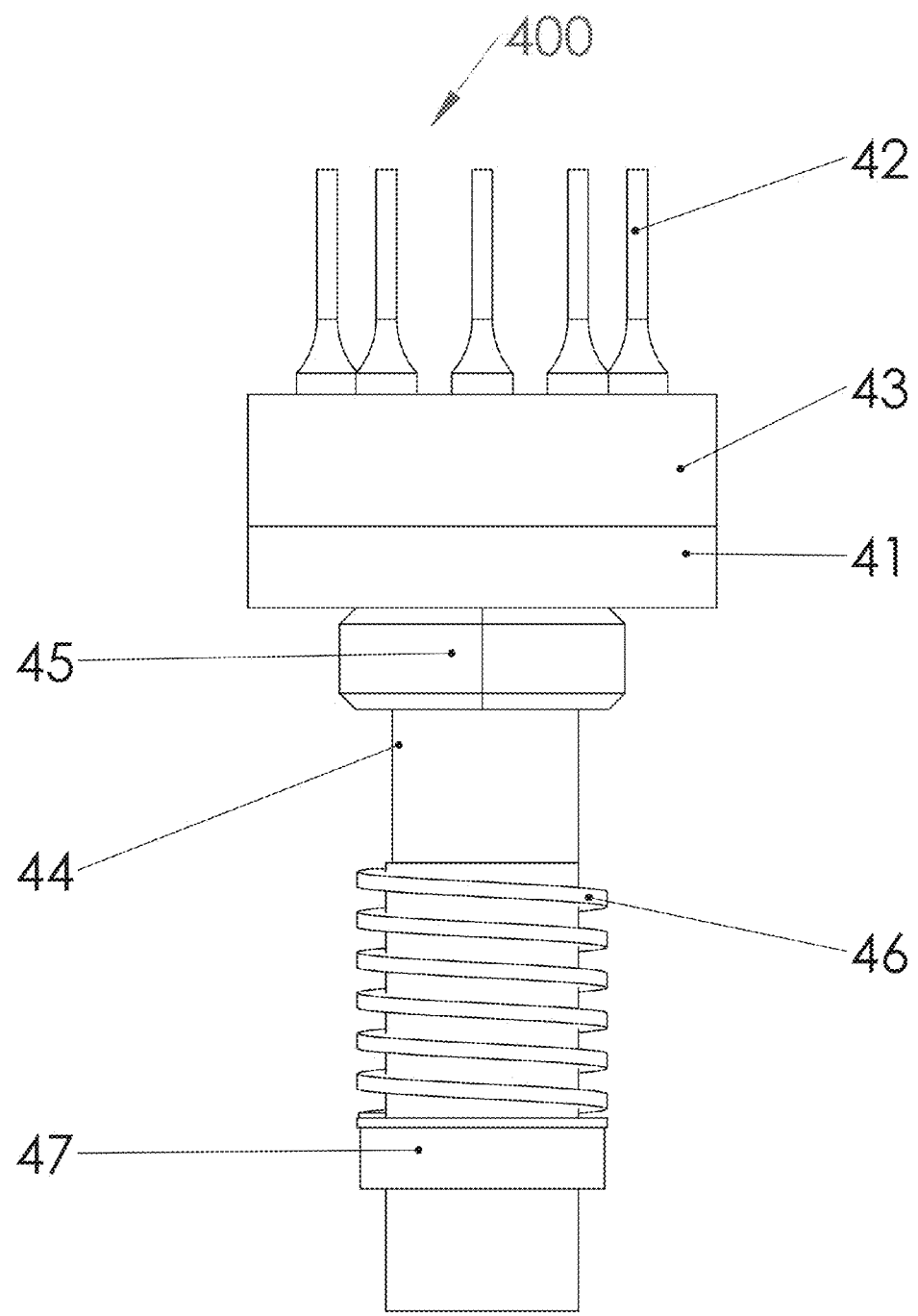

PELLET PRESS MACHINE

REFERENCE TO RELATED APPLICATION(S)

This application is a formal application based on and claiming the benefit of provisional application Ser. No. 62/094,640, filed on Dec. 19, 2014.

BACKGROUND OF THE INVENTION

The present invention relates to a press system for forming shaped articles, e.g. pellets presses or tablets presses and more particularly, although not exclusively, to a press system for use in producing tablets or pellets, which could be used in pharmaceutical, nutritional, chemical and other industries.

The terminology of tablets or pellets in this application is not limited to the oral taking medicine, it also includes the pellets of small rod-shaped or ovoid mass, as of compressed steroid hormones, intended for subcutaneous implantation in body tissue to provide time release over an extended period of time (Source: *The American Heritage Stedman's Medical Dictionary*). These pellets are surgically inserted under the skin of patients and are time released over a period of time, eliminating the need to take medication orally, through injection or topically on a daily basis. Patients that require Hormone Replacement Therapy, Diabetics requiring insulin, or individuals that want vitamins and minerals will benefit from the use of these pellets. And therefore it is of great importance that our invention accomplishes the manufacture of these pellets in great accuracy and repeatability to ensure no harm is incurred by the individual. The small diameter, hardness, dissolution rate and friability to manufacture pellets can not achieved by the traditional tablet or pellets making machines.

Right now, the large-scale production of tablets or pellets typically involves the use of tablet punches which operate to compact a volume of powder filled in a die. The powder in the die is held between opposing punches which move together by a predetermined distance of travel to produce a tablet of controlled thickness within a die of known geometry. This is such that the formed tablet has a known or determinable density according to the die geometry and volume of powder used but there is no direct control of the force applied to the powder during the filling process.

It is because the pellets press machines in the prior art, such as US 2009/0130243 A1 or WO 2014/001805, rely on gravity feed only or a combination of gravity feed and fan feed blades to the dies. These methods of feeding do not allow the use of dense or sticky powders to be used. These powders will not flow downwards into the dies because they bind together and need an external force to force them into the dies. No downward force is produced by the fan blades and their purpose is to control the rate at which the dies are filled. To allow powders to flow in the prior art an excipient needs to be added, this can cause a change in powder formulation with undesirable results and therefore not allow new formulas or natural ingredients to be used as powder.

Even though a pellet molding apparatus, as in U.S. Pat. No. 4,317,649, have an auger filler to fill die holes. But because of the auger distance away from the die holes, the auger only acts as a switch to allow the flow of powder or stop the flow of powder. Gravity is still the force used in filling the die holes because the powder falls from the auger location down the tube then into the dies.

The prior art has a limitation of only filling large diameter of die size holes accurately. It is also because there is no force used for filling the dies, the hardness or accuracy of dose of the pellets can not meet the requirement to be used as a subcutaneous implantation in body tissue.

In view of the preceding, it would therefore be advantageous to have a press machine that can use dense and sticky powder to produce small diameter, hardness, dissolution rate pellets of outstanding accuracy, which can be surgically inserted under the skin of patients and be time released over a period of time.

BRIEF SUMMARY OF THE INVENTION

It is therefore an object of the invention to provide a pellet press machine, which can fill the dies with force so as to produce small diameter and hardness pellets with dense and sticky powder.

It is therefore another object of the invention to provide a pellet press machine, which can directly and precisely control the volume (dose) of powder for each pellet.

It is therefore another object of the invention to provide a pellet press machine that can produce a small batch of pellets at one time.

Generally, the pellet press machine of present invention, comprises a die block assembly for receiving powder to be compacted and a press assembly for compacting the powder in use, the dies holder of the die block assembly is laterally movable along a linear horizontal axis between the filling location in which an array of dies on the dies holder are filled with the powder to be pressed and the pressing location in which the powder in dies are pressed to form pellets.

The filling location includes a filling assembly. The filling assembly includes an auger to force the powder into the dies. The auger has a specific helix angle to force the powder into the dies and a knife edge to scrape the top of the dies to assist in correct volume.

In more details, the filling assembly includes a hopper, an auger, and motor. The motor drives the auger to force material in powder or granular form in the hopper to be pressed to dies. The dies are for containing pharmaceutical material in powder or granular form to be pressed. The motor can accurately control the rotation of the auger, the auger speed and auger revolutions.

The auger could be close to the surface of the dies, such as only 0.001" away from the surface of the dies, which allows an on or off force of pressure created by the 30° helix angle on the auger that force the powder into the dies. This helix angle could be adjusted according to the flow characteristics of the powder. Also because of the close proximity of the auger to the surface of the dies allows the filling of die holes as small as 0.03125" in diameter, with high repeatable accuracy within ±1%. The industry standard dimensions for medical implantation of pellets are diameters of 0.125" and 0.1875" and lengths from 0.0625" to 1.000" and the tablet machine of our invention could produce pellets of these sizes.

Optionally, the auger used in the invention incorporates a knife edge as to scrape the top edge of the dies after and during filling to ensure the volume remains accurate and to prevent pellet breakage when transferring the die block to the pressing station. The filling assembly can exert enough force at the filling station as to compact the powder into a hard pellet.

The die block assembly includes die block, this die block contains a bore to hold the dies holder as a slip fit. In the dies holder, there are an array bores that contain replaceable dies. Dies are press fit into each dies holder bore to form a plurality of arrayed through-hole dies. The dies are interchangeable for various diameters of pellets, in particular 0.125" and 0.1875" diameters, which are currently the standard for Pellet Implants that are surgically placed under the skin.

Specifically, the dies form an annular array on the dies holder and the diameter of the array circle is equal to the diameter of auger. Therefore, the knife edge of the auger is directly on the top of the dies. When the auger rotates, all the dies could be filled and scraped.

The dies could be made of stainless steel. Optionally, to avoid the molded powder adhering to the walls of the dies, the dies could be made of Delrin® or other material to reduce friction.

It could also include die block bushing and die block adjustment assembly. The die block bushing mounted to the lower step of the die block and it allows the linear movement of the die block assembly in a vertical plane and to control the position accuracy of the adjustment assembly.

The die block assembly further includes a rail and the rail provides a bearing surface for the die block assembly to mount and provide linear horizontal movement laterally of the dies holder between the filling location and the pressing location.

Because the dies movement is along a linear horizontal axis, which does not consist a rotational movement as normal press machine, the dose of packed power in the dies would not be changed and it brings the advantages of controlling the dose precisely.

The machine could further include pellet ejection assembly and adjustment assembly inside the die block assembly.

The pellet ejection assembly includes lower punches, which have a plurality of lower punches arrayed to correspond to the through-hole dies, and the lower punches are in the same vertical axis as the through-hole dies, and the lower punches enter from below the through-hole holes of the die block to form the bottom walls in the through-die. In this state, the filling assembly force molding powder into the through-hole dies.

After the pellets have been formed in the dies from compression, the lower punches could move upward to push the pellets up to the die block surface to be removed from the die block. After the pellets removed from the die block, the lower punches move downward to the die holes to form the bottom walls in the through-hole dies.

The adjustment assembly is for adjusting the depth of lower punches in each die so as to adjust the volume (dose) of each pellet. It includes an adjustment rod assembly consisting of an adjustment nut and a threaded shaft to adjust the depth of lower punches in the bottom of the dies so as to adjust the depth of each die, so as to control the dose (volume) of each pellet.

The pressing location includes a press assembly for compressing the powder to form pellets and pellets removal assembly for removing the pellets from the dies.

The press assembly includes upper punches, which have a plurality of upper punches arrayed to correspond to the through-hole dies and disposed above the dies block while the die block moves to the pressing location. It is movable upward and downward in the pressing location. The upper punches move downward and enter the through-die holes from the top and the molding powder is compressively molded by and between the upper punches and lower punches. After the pellets are formed, the upper punches move upward out of the dies and the lower punches move upward to eject the pellets from the dies. The upper punch could be driven by pneumatic pressure. The upper and lower punches along with the dies are interchangeable with other sizes of punches and dies to control dosing even further.

The removal assembly includes pellet remover, wherein the pellet remover moves horizontally along the die block surface to remove the pellets off of the die block and into a pellet collecting container. The pellet remover is above the die block with a clearance, which allow for no friction and avoid the possibility of metal wear contamination of the pellets. After the pellets are removed from the die block, the lower punches move downward in the dies and the die block is moved back to the filling location for the next batches of pellets making.

The pellet press machine could also include power system, which supply energy for motor or the press assembly. It is preferred that the upper punches assembly are driven by pneumatic pressure. And the punches assembly could also be driven by servo motor to control downward pressure and speed. The pellet press machine could also include a control system for automatic control of the machine.

To meet the GMP and FDA requirement of "components that come into contact with the products must be able to be sterilized", all the parts could be made from stainless steel and non-toxic materials.

The pellet making process of the pellet press machine of the present invention is performed in the following manner: At first, the dies holder is located at the filling location, the lower punches enter from below the through-hole dies to form the bottom walls in the through-die. In this state, the auger of the filling assembly presses powder from the hopper into the through-hole dies; next, the dies holder moves to the pressing location and the upper punches driven by the pneumatic pressure enter the through-die holes from the top of the dies holder. The powder in the dies are compressively molded by the upper punches and between the upper punches and lower punches; thirdly, the upper punches are withdrawn from the through-hole dies and the lower punches move upward to eject the pellets out of the through-hole dies, the remover slides to the surface of the die block to remove the pellets and the pellets are received by the pellets collecting container. The lower punches withdraw to the bottom of the dies and the dies holder moves back to the filling location. Such operation is repeated.

Further details of the invention will be described or will become apparent in the course of the following detailed description and drawings of specific embodiments of the invention, as examples.

BRIEF DESCRIPTION OF THE DRAWINGS

Embodiments of the invention will now be described, by way of example only, with reference to the attached drawings, in which:

FIG. 2b is a section view of the filling assembly of FIG. 2 with the dies holder at the filling location A.

FIG. 3b is a top view of FIG. 3.

FIG. 4 is a plan view of the pellet adjustment assembly and ejection assembly of the machine of the invention;

DETAILED DESCRIPTION OF THE INVENTION

Figure 1:
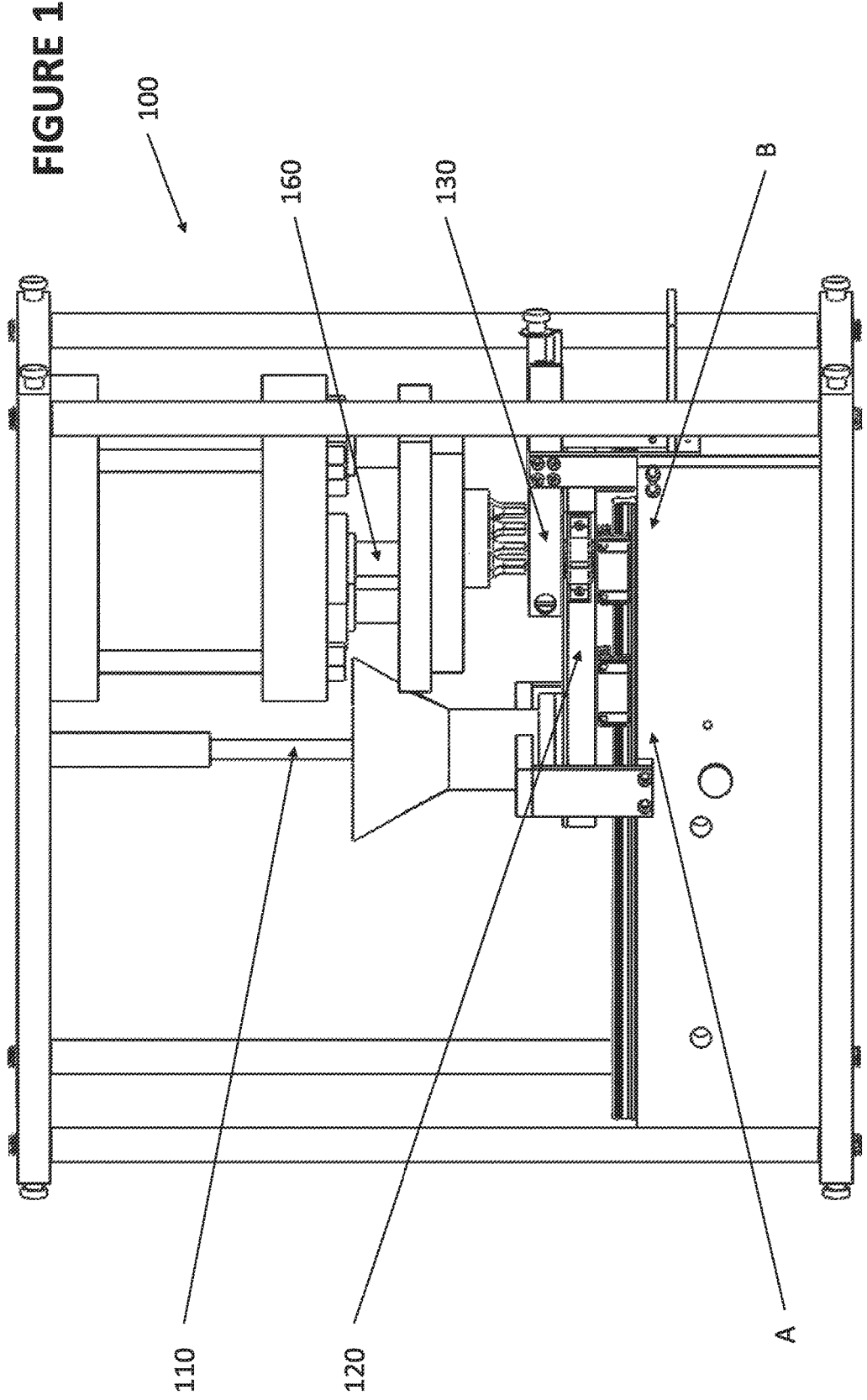
FIG. 1 is a perspective view showing a whole construction of pellet press machine of an example of the invention.
Figure 1A:
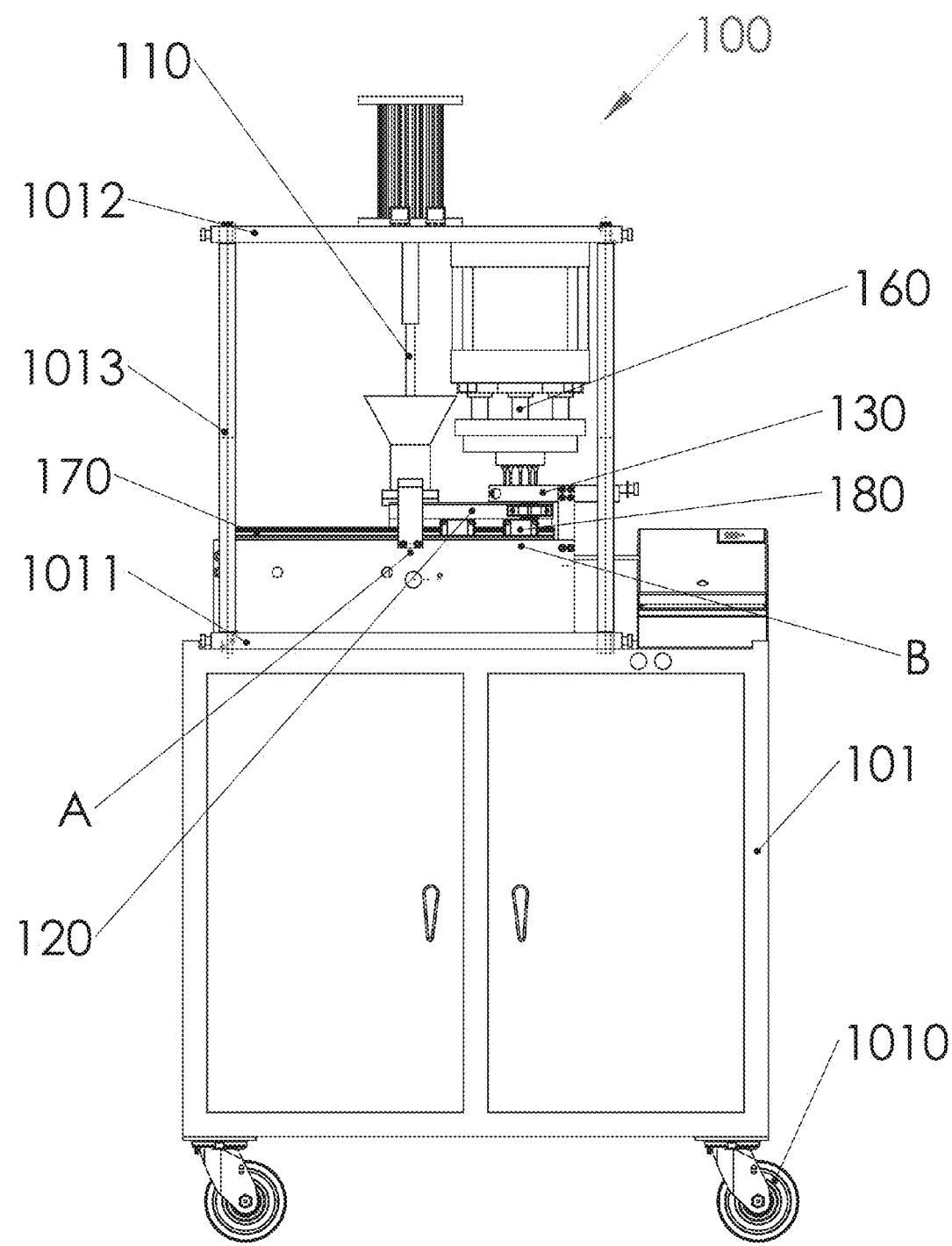
FIG. 1a is a plan view of the machine as in FIG. 1 with a cabinet.

The pellet press machine of the present invention is shown generally in FIG. 1 and FIG. 1a. The press machine 100 includes a filling assembly 110 at a filling location A and a press assembly 160 and a pellet removal assembly 130 at a pressing location B. It also includes a die block assembly 120, which moves laterally between the filling location A and the pressing location B. A pellet ejection assembly and an adjustment assembly could also be included in the die block assembly 120. All the assemblies will be discussed in more detail hereinafter.

As shown in FIG. 1a, the press machine 100 is supported on a cabinet 101. The cabinet 101 could be used to contain the air compressor which provides air for the press assembly and the pellet ejection assembly. PLC with electrics which control the operation of the press machine could also be contained in the cabinet 101. To position the machine, four moveable casters 1010 could be fitted on the bottom of the cabinet 101.

A lower support plate 1011 and a upper support plate 1012, a number of support bars 1013 are provided on the cabinet 101 to form a space to keep and support the press machine. The lower support plate 1011 is the base of the pellet press machine 100, and it is used to support and provide a means to fasten support bars. The support bars 1013 support the upper support plate in position and are fastened to the lower support plate 1011 and upper support plate 1012. To enclose the pellet press machine from the left, right and rear sides to prevent contamination of the machine, acrylic covers (not shown) could be mounted to the lower and upper support plates.

Filling Assembly

Figure 2:
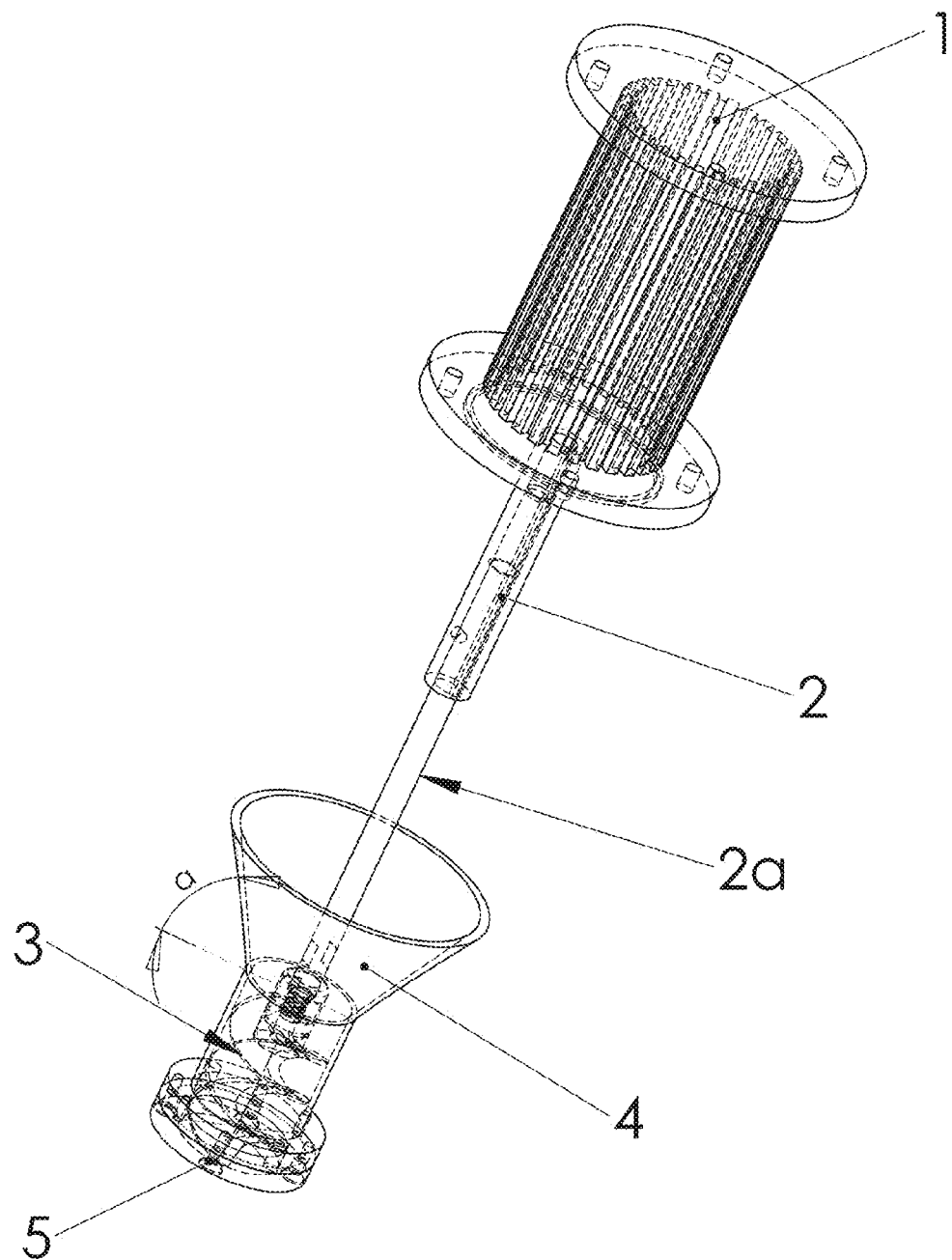
FIG. 2 is a plan view of the filling assembly of the machine of the invention.

As shown in FIG. 2, the filling assembly includes a motor 1, an auger shaft coupling 2, auger shaft 2a, an auger 3, a hopper 4 and a nylon spacer 5.

Figure 2A:
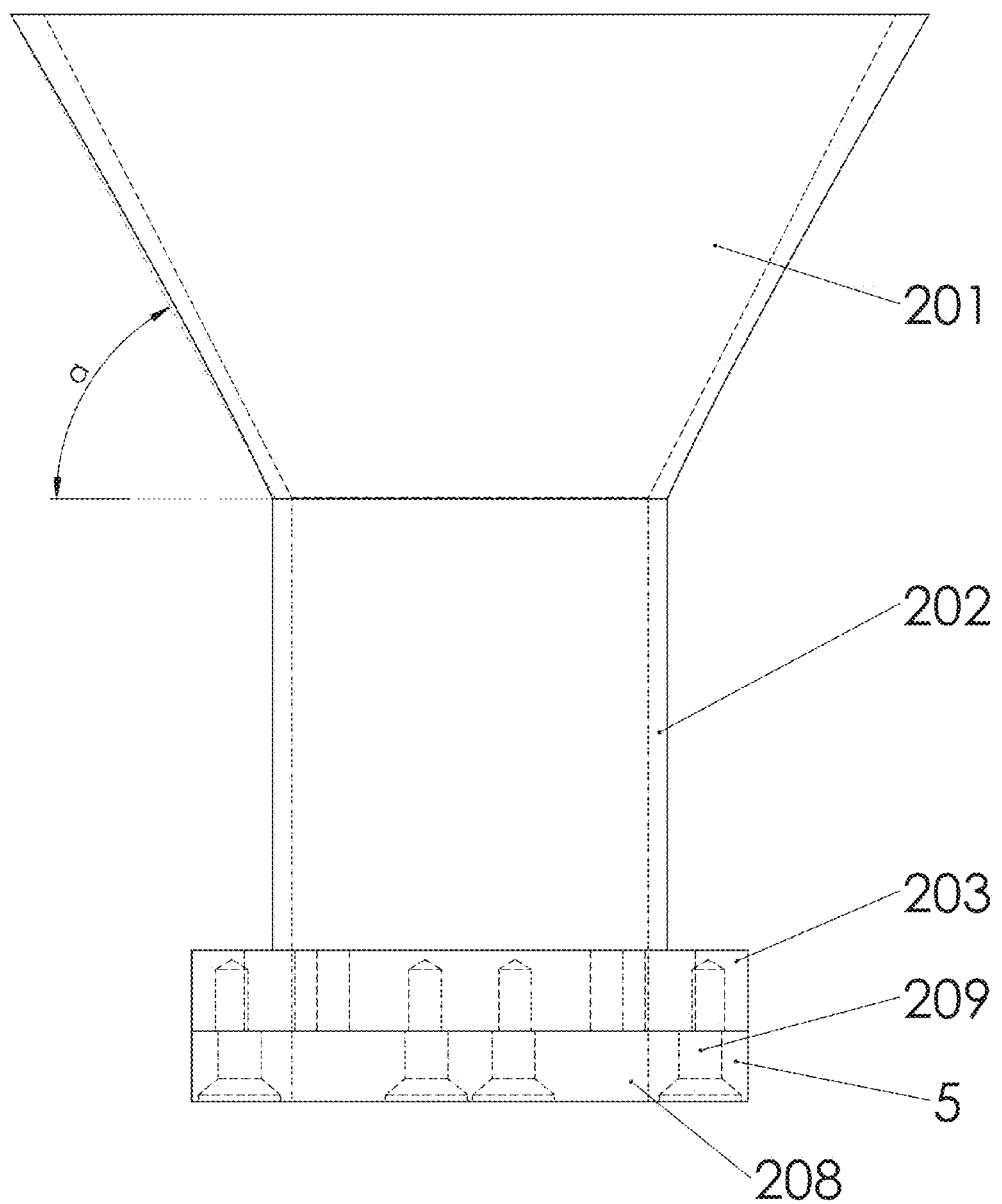
FIG. 2a is a section view of the hopper and the spacer as in FIG. 2.

The hopper is for keeping the material to be compressed into pellets. The hopper could be supported by a hopper support in alignment with the auger, and the dies holder when at position A. As shown in FIG. 2a, the hopper 4 is formed of an inverted cone frustum part 201, and a cylindrical part 202 at the bottom. The inverted cone frustum part 201 is made with an angle of a less than 60°, to provide easy pouring of the powder, to increase the volume of powder available and a means to feed the auger.

The nylon spacer 5 acts as a wear surface between the dies holder as it slides from position A to position B. As shown in FIG. 2a, the nylon spacer 5 is fastened to the lower flange part 203 of the cylindrical part 202 through the fastener hole 209. The nylon spacer 5 has a middle hole 208 in the center of the nylon space 5 with same diameter of the outlet of the cylindrical part 202. When the die block is located at the filling location A, the nylon spacer 5 is right at the top of the dies holder and touching the dies holder surface. Powder in the hopper can be added to the dies through the middle hole 208 of the spacer 5. The middle hole 208 of the nylon spacer 5 allows a pass through for the auger 3 and a compaction area between the auger and hopper.

The auger 3 forces the powder through the nylon spacer and then into the dies. The auger 3 allows the use of highly dense and sticky powders.

FIG. 2b shows the filling assembly with the dies holder at the filling location. As shown in FIG. 2b, the auger 3 is located in the cylindrical part 202 of the hopper and extended to the spacer 5 and it is made with a helix angle of 30° to its horizontal axis to provide a method to force the powder into the dies 54. The helix angle could be adjusted according to powder density to ensure accurate and consistent filling. For high density powder, the helix angle could be larger, such as 45° and for the lower density powder, the helix angle could be less, such as 25°.

Especially, the auger 3 is close to the top surface of the dies holder, for example, the distance of the auger 3 to the top surface of dies holder 48 is 0.001", allowing direct force to compact the powder into the dies.

The close proximity of the auger (0.001") to the top surface of the dies holder or die holes and an auger helix angle of 30° perpendicular to its horizontal axis allows the filling of die holes as small as 0.0625" in diameter, with high repeatable accuracy and a tolerance within ±1 error.

As shown in FIG. 2b, the auger 3 has a Sharp knife edge 301 on the lower section of the auger 3. The sharp edge 301 sits right above the dies 54 and scrapes the surface of the dies to ensure the powder in the dies are all the correct height. Forcing of powder from and through the auger into the dies and the scraping of the top surface of the dies allows the high degree of accuracy of filling dose for each dies.

Optionally, the dies 54 are arranged in a circle on the dies holder as shown in FIG. 3b and the diameter of the circle is same to the diameter of the auger 3. Therefore, when the dies holder is at the filling location A, the shape edge 301 sits right above the dies (as shown in FIG. 2b). Therefore, when the auger rotates, it can force the powder into each die and scrape the top surface of each die.

The motor 1 is mounted on the upper support plate as shown in FIG. 1 and it provides rotary movement of the auger shaft 2a and the auger 3.

Use of the motor 1 allows for the use of dense and sticky powders that would be difficult to be compressed manually using a hand wheel. Motor 1 also prevents operator fatigue as the operator does not have to provide the rotary movement by hand. Auger shaft coupling 2 connects the motor 1 and the auger shaft 2 to provide a means to disconnect the auger shaft and auger 3 from the motor 1 for cleaning.

Die Block Assembly

Figure 3:
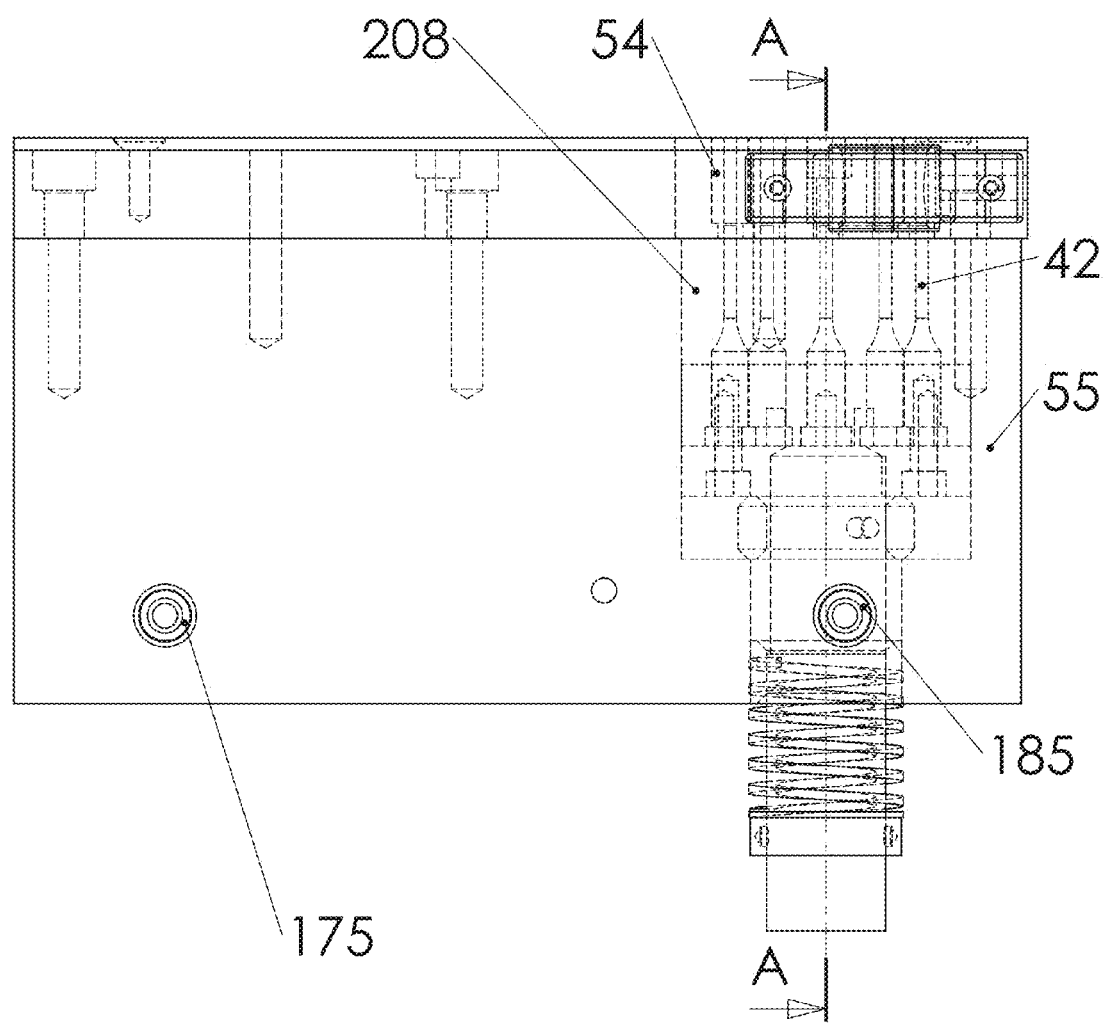
FIG. 3 is a front view of the die block assembly of the machine of the invention.
Figure 3A:
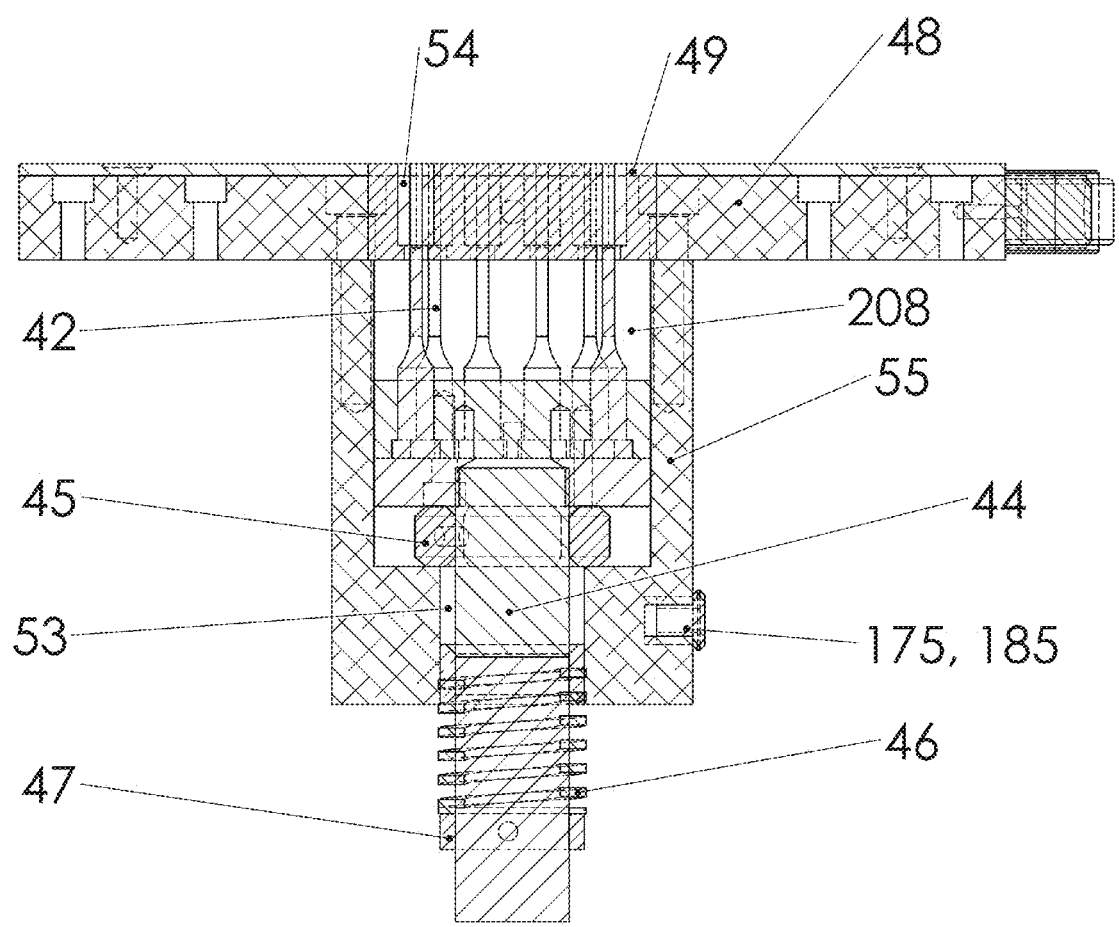
FIG. 3a is a side section view of FIG. 3 taken at line A-A.

As shown in FIGS. 3, 3a and 3b, the die block assembly includes a die block 48 and dies holder 49. In the die block 48, there is a bore 208 contains the dies holder 49 as a slip fit. Contained in the dies holder 49 are a plurality of dies 54 that are a press fit into each dies holder to form a plurality of arrayed through-hole dies to match the location of the lower punches 42.

As shown in FIG. 3b, the dies 54 are arranged on a circle on the dies holder 49 as shown in FIG. 3b and the diameter of the circle is same to the diameter of the auger 3.

It could also include die block bushing 53 and die block adjustment rod 44. The die block bushing mounted to the lower step of the die block and it allows the linear movement of the pellet ejection assembly in a vertical plane and to control the position accuracy of the die block adjustment rod. The die block bushing 53 provides a bearing surface for the die block adjustment rod and provides linear movement for the die block adjustment rod 44.

The die block assembly moves along laterally between the filling location and the pressing location. The die block assembly is supported on carriages 180 FIG. 1*a*, and moves laterally along rails 170 between positions A to position by handle 50 FIG. 3*b*.

Locating bushings 175 and 185 in the pellet ejection assembly holder 55 allow to locate and lock the die block assembly in positions A for filling the dies and position B for pressing the powder to mold the pellets and ejecting the molded pellet to the surface of the dies holder 49.

Pellet Ejection Assembly (Lower Punches) and Adjustment Assembly

As shown in FIG. 3 and FIG. 4, inside the pellet ejection assembly holder 55, it could further include pellet ejection assembly and an adjustment assembly inside the die block assembly. The pellet ejection assembly includes lower punches 42, which have a plurality of lower punches arrayed to correspond to the through-hole dies, and the lower punches 42 are in the same vertical axis as the through-hole dies and the lower punches enter from below the through-hole dies to form the bottom walls in the through-hole dies. In this state, the powder supply mechanism section fills molding powder into the through-hole dies.

The lower punches 42 are mounted on a lower punch holder 43. The bottom of the lower punch holder 43 is threaded to allow for the mounting of the adjustment rod 44 and the adjustment rod 44 can be pressed upwards by a pneumatic lower cylinder (not shown). The adjustment rod 44 is lowered by the expansion of the adjustment rod spring 46 that is held in place by the adjustment rod lock collar 47. The pneumatic lower cylinder is mounted underneath the lower support plate. The movement of the adjustment rod 44 drives the lower punches 42 in the dies to move upward to release the solid formed pellets from the dies. The pellets are pressed up with the lower punches 42 and discharged from the upper side of the die block for pellets to be removed from the die block by remover assembly. After the pellets removed from the die block, the adjustment rod 44 moves downward from the lowering of the pneumatic cylinder and the adjustment rod spring 46, therefore, the lower punches 42 are sitting at the bottom of the dies and the dies can be filled with powder.

To facilitate introduction of a portion of powder to be compressed, the depth of the dies could be adjusted by adjusting the depth of the lower punches 42 in the dies. To adjust the depth of the lower punches in the die, an adjustment assembly below the die block is also provided. As shown in FIG. 4, on the top section of the adjustment rod 44, there is an adjustment rod nut 45 and it allows for the vertical movement of the adjustment rod 44 for the desired height in the dies holder. An adjustment rod spring is mounted around the lower section for the adjustment rod and allows for the retraction of the pellet ejection assembly to the lowered position. An adjustment rod lock collar 47 is also mounted to the lower section of the adjustment rod 44 below the adjustment rod spring and allows for the adjustment rod spring to be held into position. When the adjustment rod nut 45 rotated down, the adjustment rod moves up through the die block bushing 53 and lower punches move upwards in the dies to decrease the depth of the dies so as to decrease the dose of each pellet. On the other hand, when the adjustment rod nut rotated up, the adjustment rod moves down through the die block bushing and the lower punches move downwards in the dies to increase the depth of the dies so as to increase the dose of each pellet.

Press Assembly (Upper Punches)

Figure 5:
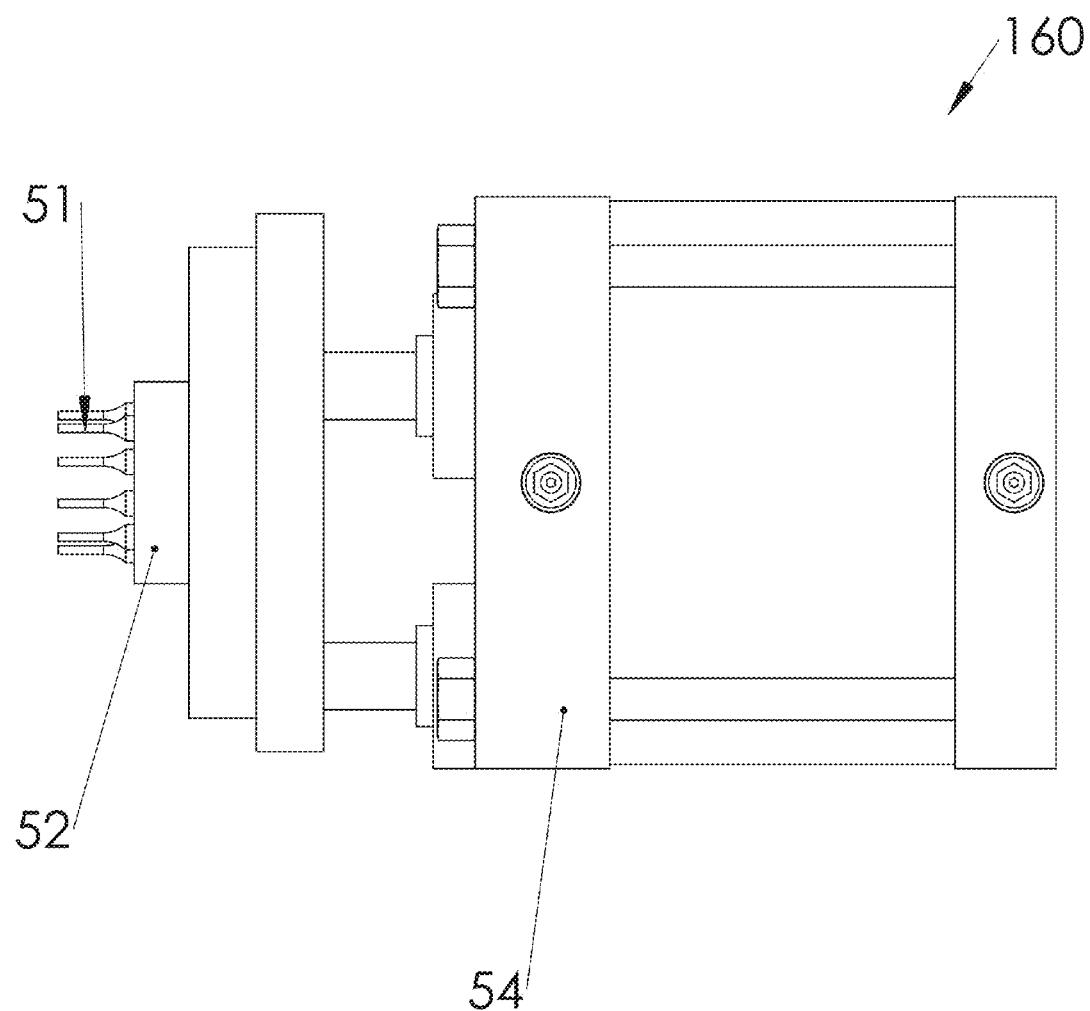
FIG. 5 is a plan view of the press assembly of the machine of the invention (upper punches)

As shown in FIG. 5, the press assembly 160 includes upper punches 51, which are held on the upper punches holder 52. The punches holder 52 is driven by pneumatic tool plate cylinder. When the die block enter the pressing location with powder in each dies, the upper punches 51 driven by the cylinder downward and enter each dies from the top. The powder in each dies is compressed into a pellet between a pair of upper and lower punches individual to the die. The pellet hardness and pellet dissolution rate is controlled by the adjustable pressure and adjustable pressure time of the pneumatic cylinder. After that the upper punches are subsequently retracted by the cylinder from the dies and the lower punches being pushed through the dies to eject the formed pellets from the dies.

Pellet Removing Assembly

Figure 6:
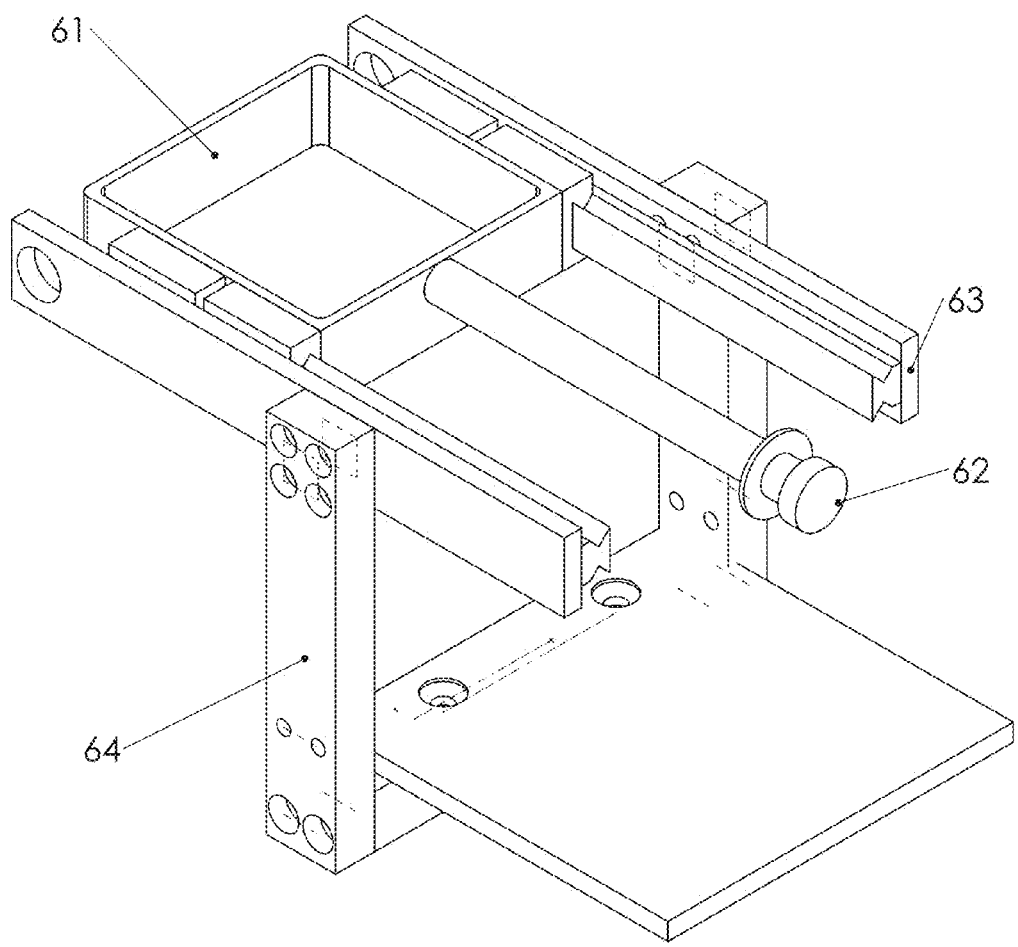
FIG. 6 is a plan view of the pellet remove assembly of the machine of the invention.

After the pellets are ejected from the dies to the surface of the die block, the pellet removing assembly removes the pellets from the die block surface. As shown in FIG. 6, the pellets removing assembly includes a pellet remover 61 and the pellet remover 61 is mounted on a pellet remover slide 63 for the pellet remover 61 to move horizontally along the slide. The slide 63 is installed on a pellet remover slide support 64 to keep the pellet remover 61 above the die block with a clearance of 0.001" and be able to remove the pellets off of the die block surface and into the pellet container. Optionally, a pellet remover bar 62 on the pellet remover 61 could be mounted for operator to move the remover horizontally.

Optionally, a position sensor could be mounted to the pellet remover slide support to send a signal to detect the location of the pellet remover to prevent machines pressing operation while the remover is right at the top of the die block preventing damage to the machine.

It will be evident to those knowledgeable in the field of the invention that many variations on the example(s) described above are conceivable within the scope of the invention. It should therefore be understood that the claims which define the invention are not restricted to the specific examples(s) described above. Possible variations include, for example, the shape of the Dies, the shape of the pellets, the arrangement of the dies on the dies holder, and so on.

Further variations may be apparent or become apparent to those knowledgeable in the field of the invention, within the scope of the invention as defined by the claims which follow.

The invention claimed is:

1. A pellet press machine, comprising a die block assembly for receiving powder, and a press assembly in a pressing location for compacting the powder, the die block assembly having a dies holder, and the dies holder being laterally movable along a linear horizontal axis between a filling location in which an array of dies on the dies holder are filled with the powder and the pressing location in which the powder is pressed to form pellets;

wherein the filling location includes a filling assembly, and the filling assembly includes an auger configured to force the powder into the dies.

2. The pellet press machine as in claim 1, wherein the auger is adjacent a top surface of the dies holder such that the auger directly forces powder to fill the dies and compacts the powder into the dies.

3. The pellet press machine as in claim 2, wherein the auger has a sharp knife edge on a lower section of the auger for scraping a surface of the dies.

4. The pellet press machine as in claim 2, wherein the dies are arranged in a circle on the dies holder and a diameter of the circle is same as a diameter of the auger.

5. The pellet press machine as in claim 1, wherein the filling assembly further includes a motor to drive the auger.

6. The pellet press machine as in claim 1, wherein the die block assembly further includes a rail and the rail provides a bearing surface for the die block assembly to mount and provide linear horizontal movement laterally of the dies holder between the filling location and the pressing location.

7. The pellet press machine as in claim 1, wherein the die block assembly further includes a pellet ejection assembly and an adjustment assembly inside the die block assembly, wherein the adjustment assembly adjusts a depth of lower punches in each die.

8. The pellet press machine as in claim 1, further including a pellet removing assembly, the pellet removing assembly including a pellet remover configured to move horizontally along a slide to remove the pellets away from the die block assembly.

9. The pellet press machine as in claim 1, wherein the press assembly includes upper punches driven by pneumatic pressure.

10. The pellet press machine as in claim 1, further comprising a nylon spacer arranged on top of the die block assembly, the auger configured to pass through an opening in the nylon spacer.

11. The pellet press machine as in claim 1, wherein the auger includes a helical bit.

12. The pellet press machine as in claim 1, wherein the auger is arranged 0.001 inches away from a top surface of the dies holder.

13. A method of forming pellets, comprising:
providing powder to dies arranged in a dies holder via an auger configured to force the powder into the dies while the dies holder is in a filling location;
moving the dies holder to a pressing location; and
pressing the powder to form pellets in the pressing location.

14. The method of claim 13, wherein the auger has a sharp knife edge on a lower section of the auger for scraping a surface of the dies.

15. The method of claim 13, wherein the auger is adjacent a top surface of the dies holder such that the auger directly forces powder to fill the dies and compacts the powder into the dies.

16. The method of claim 13, wherein the dies are arranged in a circle on the dies holder and a diameter of the circle is same as a diameter of the auger.

17. The method of claim 13, wherein the dies holder moves laterally along a linear horizontal axis between the filling location and the pressing location.

18. The method of claim 17, wherein a bearing surface provide linear horizontal movement laterally of the dies holder between the filling location and the pressing location during the moving step.

19. The method of claim 13, wherein the pressing is accomplished at least in part by upper punches driven by pneumatic pressure.

20. The method of claim 13, further comprising scraping a surface of the dies with a sharp knife edge on a lower section of the auger during or after the providing step.

\* \* \* \* \*